Nov. 12, 1968　　　J. N. GHOUGASIAN　　　3,410,093
REACTION THRUST ENGINE WITH FLUID OPERATED COMPRESSOR
Filed May 26, 1967　　　　　　　　　　　　　　　8 Sheets-Sheet 1
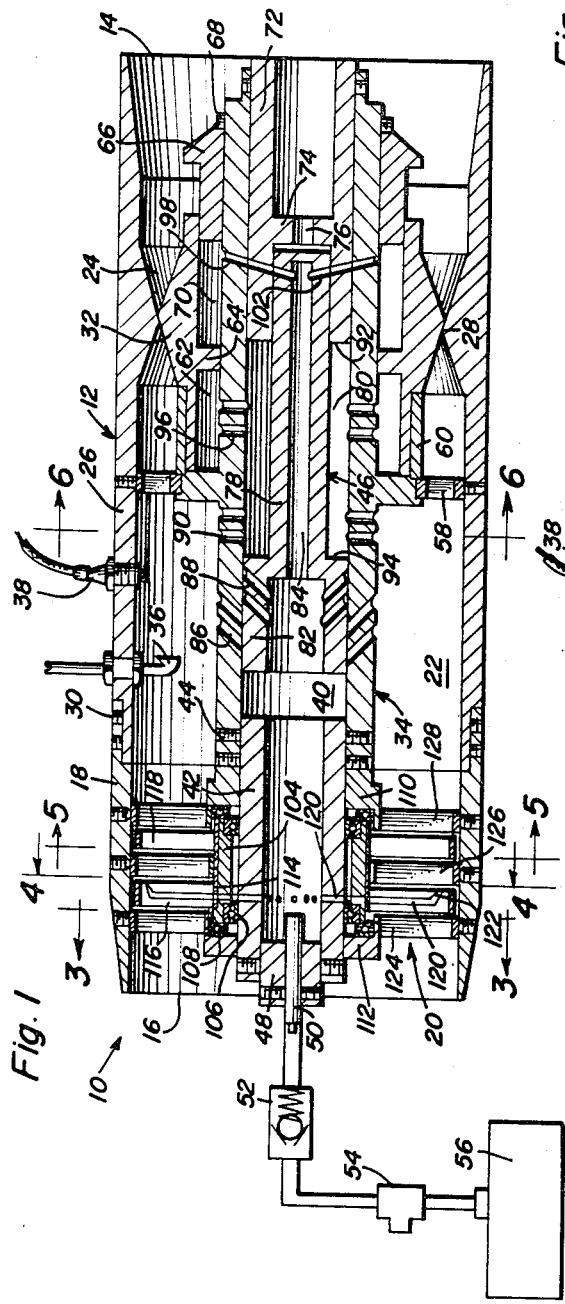
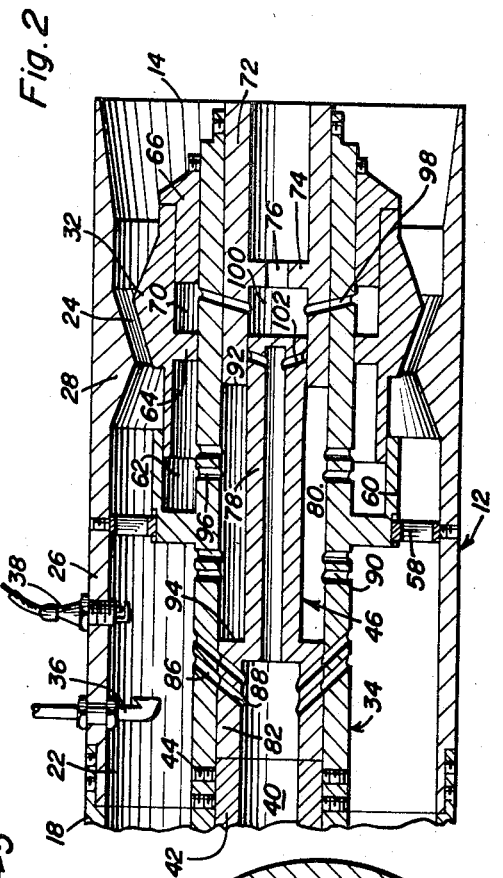
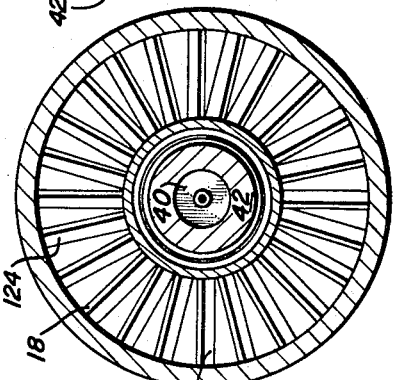
John N. Ghougasian
INVENTOR.
BY Clarence A. O'Brien
and Harvey B. Jacobson
Attorneys Nov. 12, 1968  J. N. GHOUGASIAN  3,410,093
REACTION THRUST ENGINE WITH FLUID OPERATED COMPRESSOR
Filed May 26. 1967  8 Sheets-Sheet 2
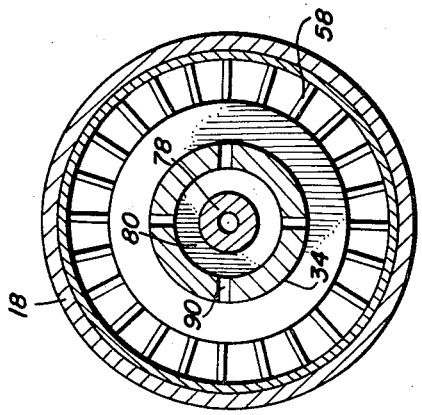
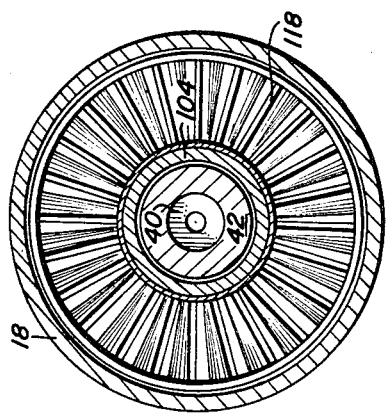
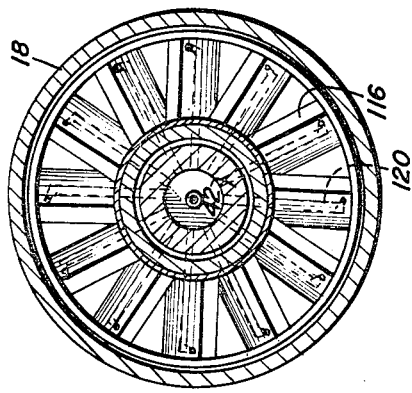
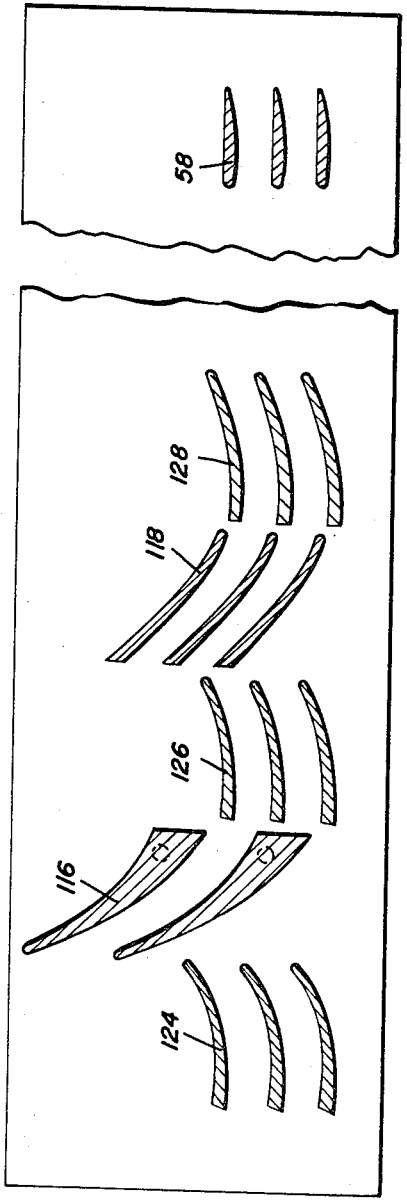
John N. Ghougasian
INVENTOR.

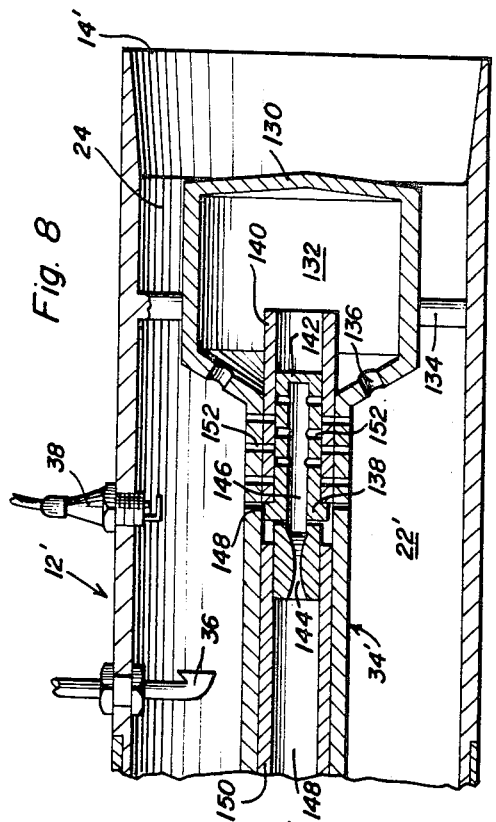
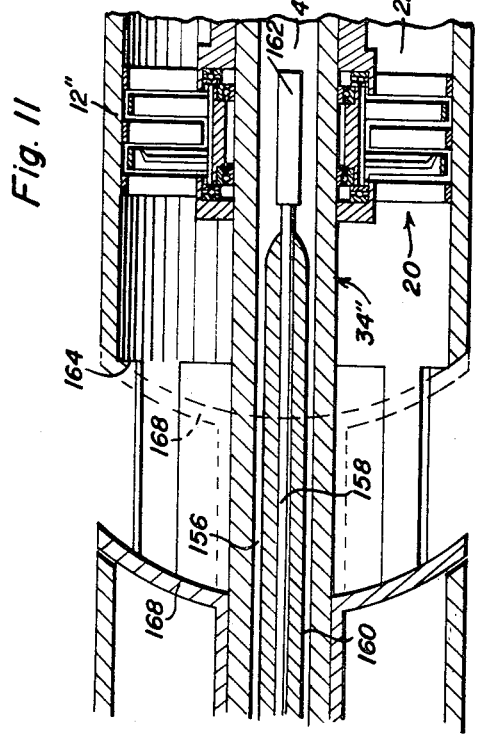
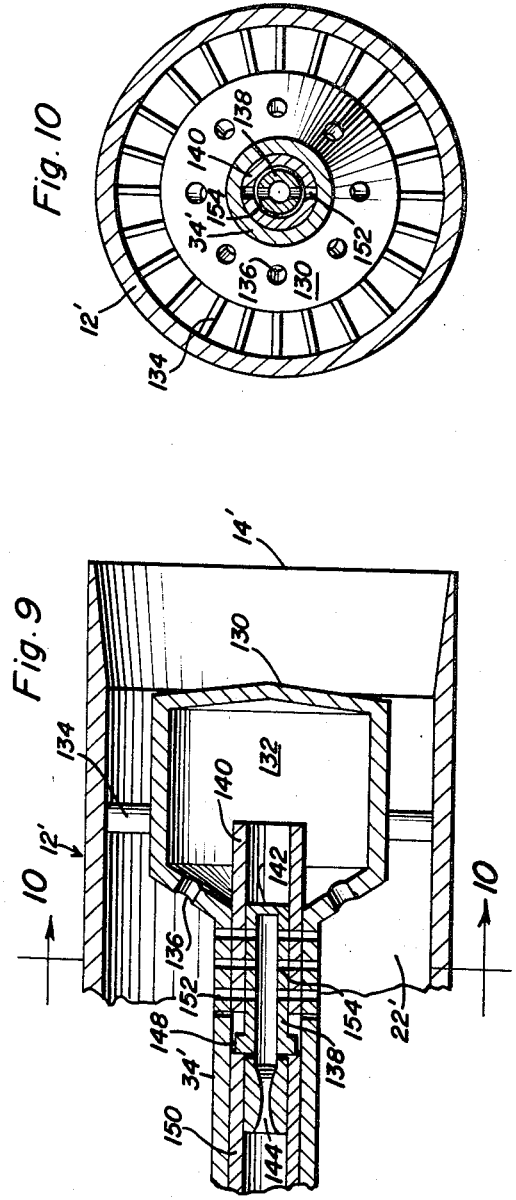
John N. Ghougasian
INVENTOR.

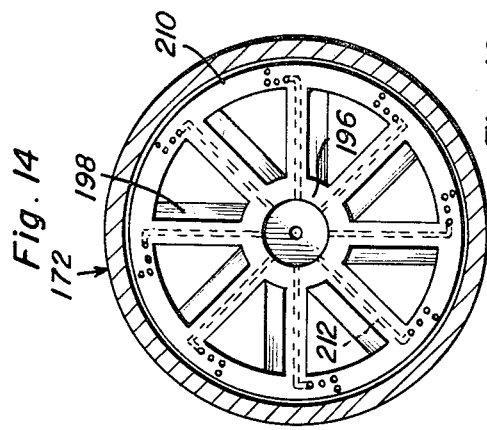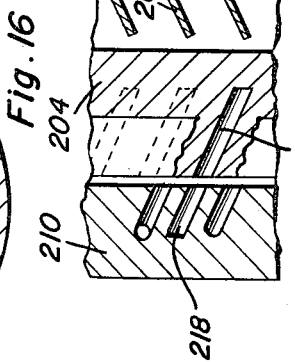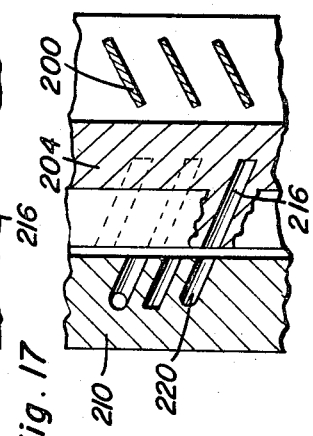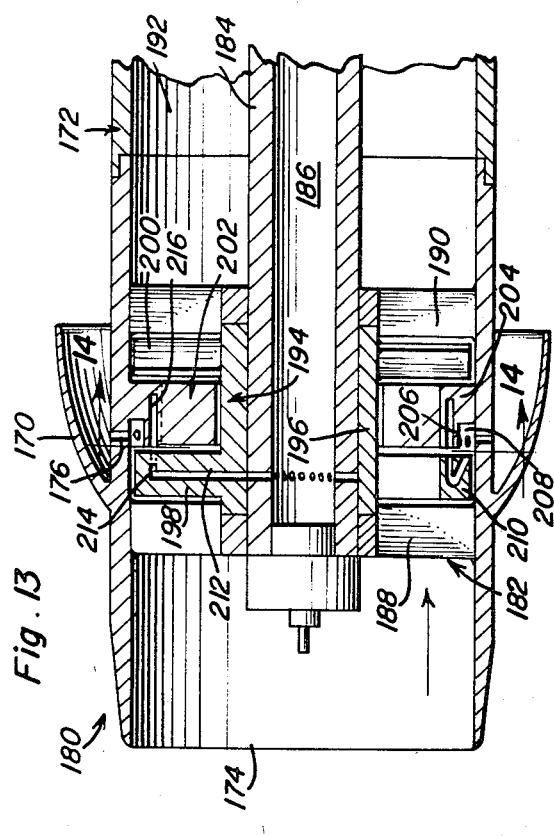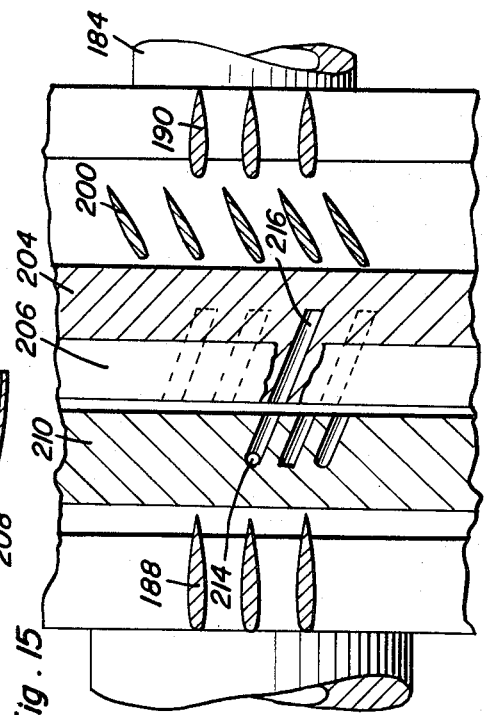
John N. Ghougasian
INVENTOR.

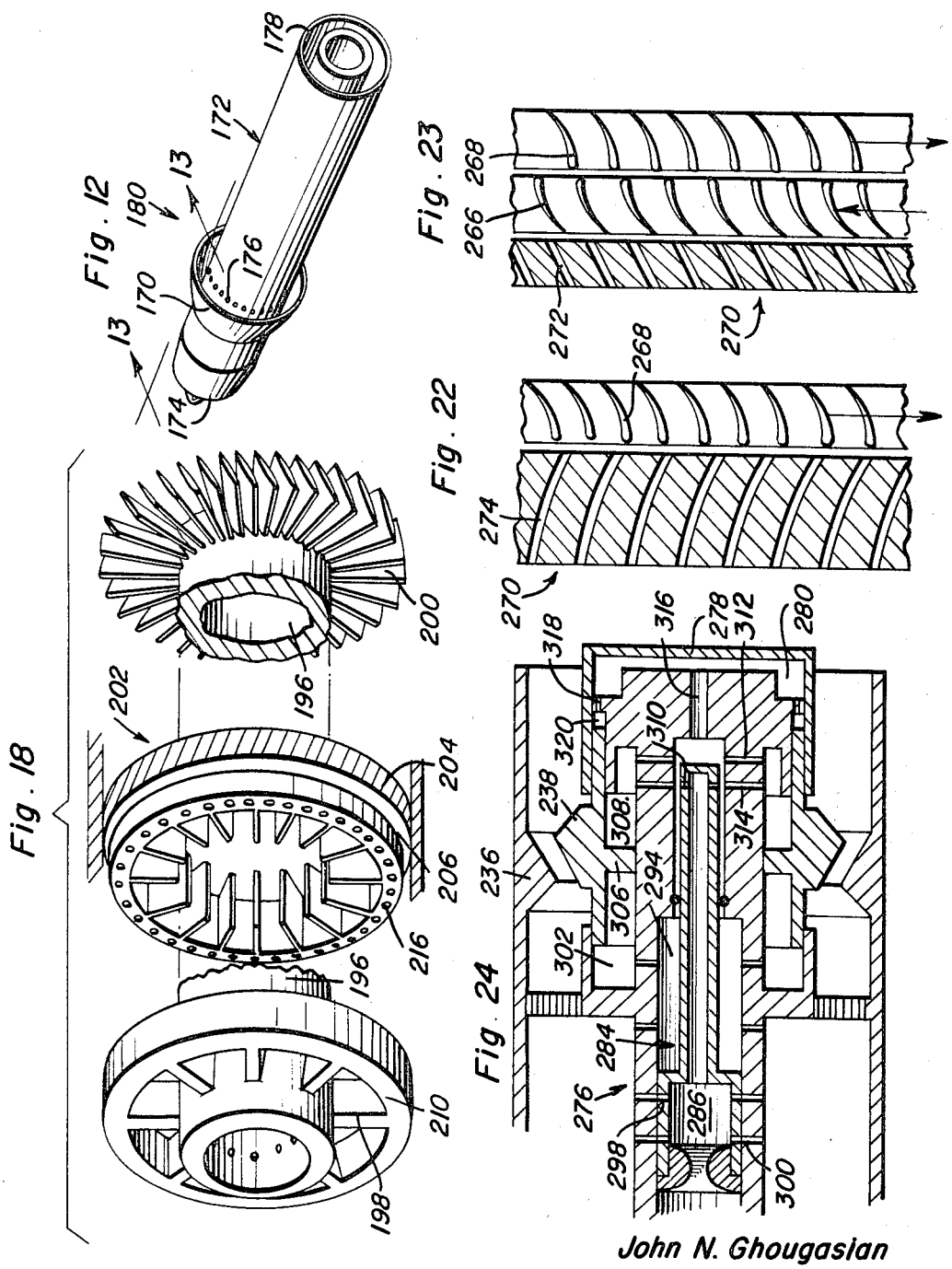

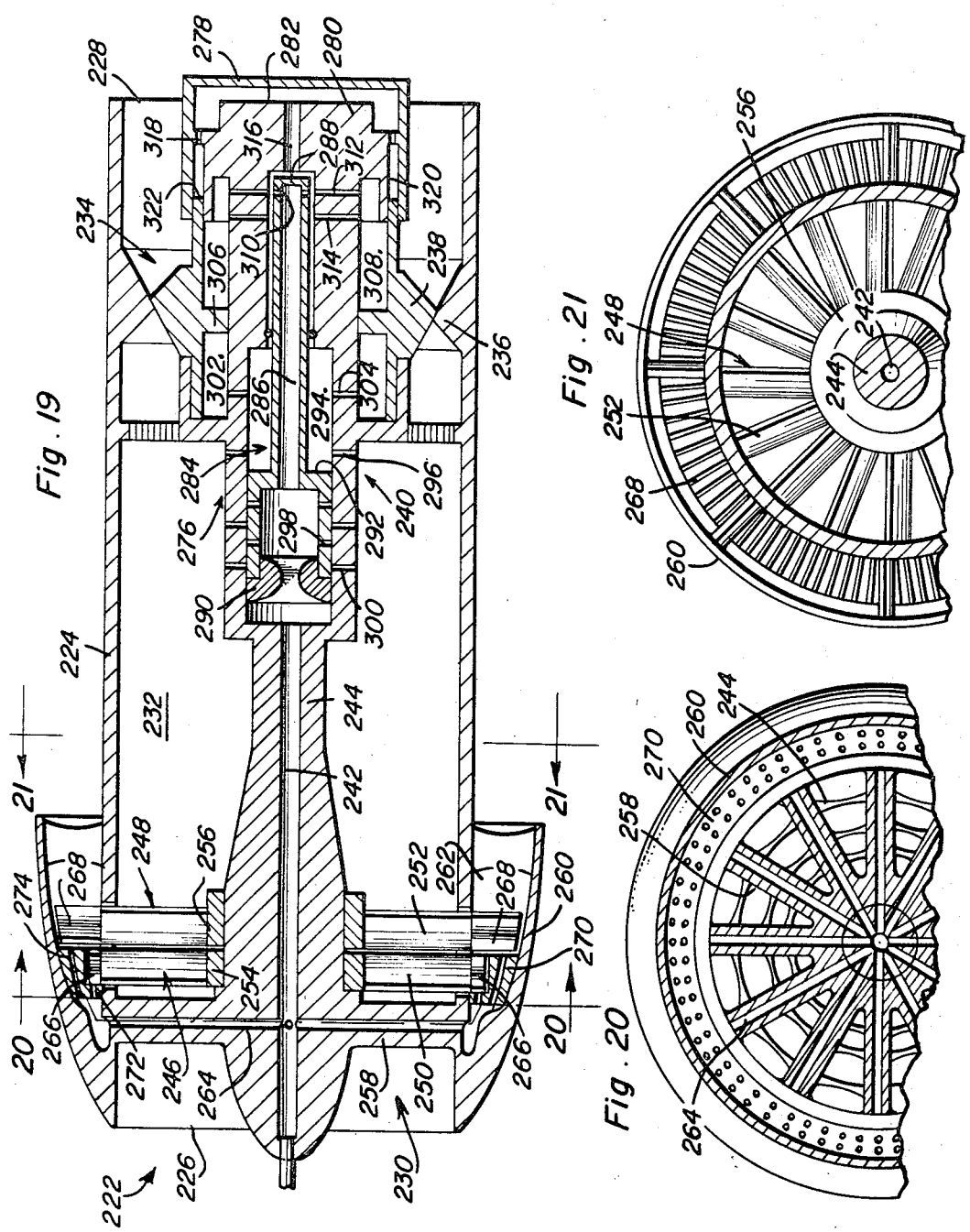

Nov. 12, 1968     J. N. GHOUGASIAN     3,410,093
REACTION THRUST ENGINE WITH FLUID OPERATED COMPRESSOR
Filed May 26, 1967     8 Sheets-Sheet 7
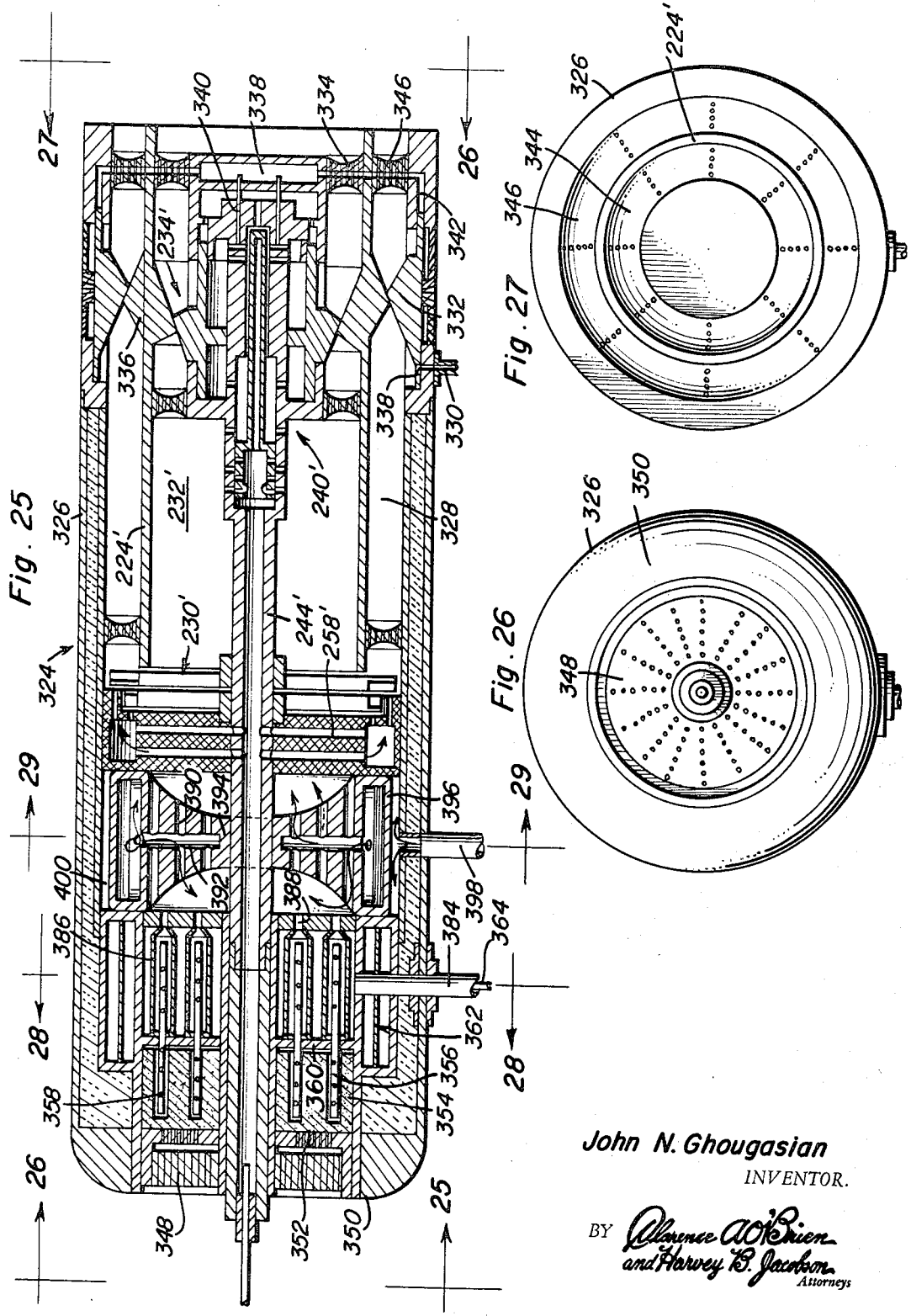
John N. Ghougasian
INVENTOR.

Nov. 12, 1968    J. N. GHOUGASIAN    3,410,093
REACTION THRUST ENGINE WITH FLUID OPERATED COMPRESSOR
Filed May 26, 1967    8 Sheets-Sheet 8

John N. Ghougasian
INVENTOR.

BY *Clarence A. O'Brien*
*and Harvey B. Jacobson*
Attorneys

United States Patent Office 3,410,093
Patented Nov. 12, 1968

3,410,093
REACTION THRUST ENGINE WITH FLUID
OPERATED COMPRESSOR
John Nazareth Ghougasian, 666 W. 188th St.,
New York, N.Y. 10040
Continuation-in-part of application Ser. No. 577,635,
Sept. 7, 1966. This application May 26, 1967, Ser.
No. 648,524
34 Claims. (Cl. 60—269)

ABSTRACT OF THE DISCLOSURE

A reaction thrust producing engine having an intake compressor driven by reaction jets of pressurized fluid diverted from the combustion products rearwardly discharged through a main discharge nozzle to produce forward thrust. The engine is started by a supply of pressurized fluid to the compressor from an external source automatically cut off and replaced by combustion products when sufficient pressure has been developed in the combustion chamber.

Related application

This application is a continuation-in-part of my prior copending application U.S. Ser. No. 577,635, filed Sept. 7, 1966, which is now abandoned, and incorporates the disclosure presented therein.

Background of the invention

This invention relates to reaction motors of the internal combustion type having a compressor through which a combustion supporting medium is introduced into the combustion chamber for mixing with a propellant fuel.

Thrust producing power plants of the aforementioned type usually employ a compressor which is mechanically driven by a turbine rearwardly located in the exhaust flow passage through which combustion products flow from the combustion chamber. Aside from the turbine blade cooling problem involved, there is a substantial mechanical energy loss involved as well as bearing maintenance problems in the mechanical transfer of energy from the rearwardly located turbine to the forwardly located compressor. The foregoing problems are overcome by the engine of the present invention in that the forwardly located compressor is fluid operated by a diverted portion of exhaust gases from the combustion chamber while the engine is in running condition. Further, the arrangement of the engine is such that the compressor is operated during a starting phase by pressurized fluid derived from an external source so that combustion product gases may build up in pressure within the combustion chamber.

Summary of the invention

In accordance with the foregoing, the engine of the present invention features a forwardly mounted compressor having a rotor driven by pressurized fluid supplied to reaction discharge passages or impulse turbine blades associated with the rotor. Thus, reaction jets of fluid discharged from the trailing edges of the rotor or impinging on the turbine blades operate the compressor to induce axial flow of combustion supporting air into the combustion chamber when the power plant is being utilized as a jet-type engine. It will become apparent, that the arrangement of the present invention will also make the engine suitable for rocket operation by supply of an oxidizer to the combustion chamber. Thus, the engine may propel a craft underwater or in space.

An important feature of the thrust producing engine necessary for its operation as hereinbefore described, resides in the provision of a pressure responsive valve assembly through which restricted fluid communication between the combustion chamber and the forward compressor is blocked during the starting phase of operation and opened only when the engine is in proper running condition. In one form of the invention, the main exhaust nozzle passage through which the thrust producing discharge is conducted, is also blocked during the starting phase in order to produce a more rapid build-up in pressure within the combustion chamber.

In addition to the foregoing advantages and features of the invention, the described arrangements account for a more efficient and trouble-free operating engine which is also simpler in construction and more economical to manufacture because of the reduction in bearing assemblies and in the amount of heat resisting materials incident thereto.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Brief description of the drawing

FIGURE 1 is a side, longitudinal section view through one form of thrust producing engine constructed in accordance with the present invention.

FIGURE 2 is a partial side section view similar to that of FIGURE 1 but showing the engine in its running condition.

FIGURE 3 is a transverse section view taken substantially through a plane indicated by section line 3—3 of FIGURE 1.

FIGURE 4 is a transverse section view taken through a plane indicated by section line 4—4 in FIGURE 1.

FIGURE 5 is a transverse section view taken substantially through a plane indicated by section line 5—5 in FIGURE 1.

FIGURE 6 is a transverse section view taken through a plane indicated by section line 6—6 in FIGURE 1.

FIGURE 7 is a simplified diagrammatic section view showing the blade arrangement and relationship of the compressor associated with one form of engine in accordance with the present invention.

FIGURE 8 is a partial side section view through a modified form of engine constructed in accordance with the present invention.

FIGURE 9 is a partial side section view similar to FIGURE 8 but showing the engine in a running condition.

FIGURE 10 is a transverse section view taken substantially through a plane indicated by section line 10—10 in FIGURE 9.

FIGURE 11 is a partial section view showing a thrust producing engine with a further modification in accordance with the present invention.

FIGURE 12 is a perspective view illustrating a thrust producing engine embodying yet another modification.

FIGURE 13 is an enlarged partial sectional view taken substantially through a plane indicated by section line 13—13 in FIGURE 12.

FIGURE 14 is a transverse sectional view taken substantially through a plane indicated by section line 14—14 in FIGURE 13.

FIGURE 15 is a simplified top sectional view showing the blade arrangement associated with the form of the invention illustrated in FIGURES 12–14.

FIGURES 16 and 17 are simplified top sectional views similar to that of FIGURE 15 but showing the parts in different operational positions.

FIGURE 18 is a perspective view showing parts of the compressor associated with the form of the invention illustrated in FIGURES 12–17.

FIGURE 19 is a longitudinal sectional view through a still further modified form of thrust producing engine constructed in accordance with the present invention.

FIGURE 20 is a partial transverse sectional view taken substantially through a plane indicated by section line 20—20 in FIGURE 19.

FIGURE 21 is a partial transverse sectional view taken substantially through a plane indicated by section line 21—21 in FIGURE 19.

FIGURES 22 and 23 are simplified top plan views showing the blade arrangements in the compressor portion of the engine illustrated in FIGURES 19 through 21.

FIGURE 24 is a partial longitudinal sectional view through the engine of FIGURE 19 shown in a running condition.

FIGURE 25 is a longitudinal sectional view through yet another form of engine.

FIGURE 26 is a front view of the engine shown in FIGURE 25.

FIGURE 27 is a rear view of the engine shown in FIGURE 25.

*Description of the preferred embodiments*

Figure 29:
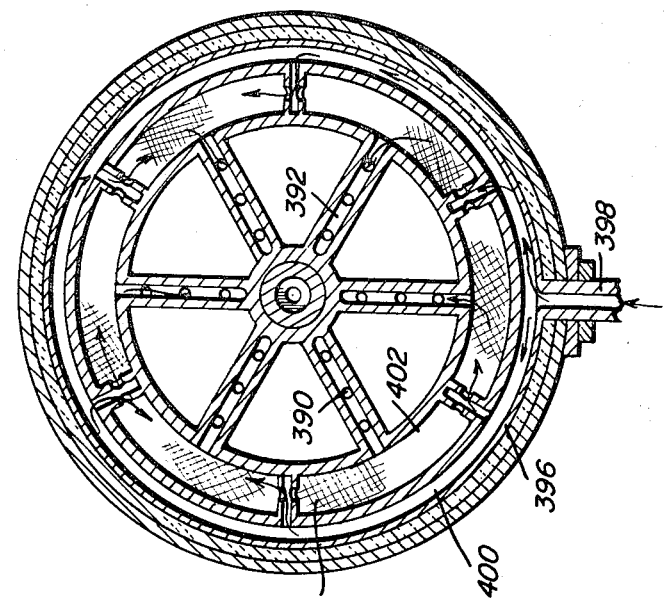
FIGURE 29 is a transverse sectional view taken through a plane indicated by section line 29—29 in FIGURE 25.

Referring now to the drawings in detail, and initially to FIGURE 1, one form of engine generally referred to by reference numeral 10 is illustrated. The engine includes an axially elongated, tubular housing generally denoted by reference numeral 12 having an exhaust end 14 and an intake end 16. The housing includes a forward section 18 within which a compressor 20 is mounted, the compressor being operative to induce an axial inflow of air through the intake end 16 in order to supply a combustion supporting medium to the annular combustion chamber 22 formed within the housing intermediate the intake and exhaust ends between the compressor 20 and an annular exhaust nozzle 24 formed within the rear housing section 26 adjacent the exhaust end. The housing section 26 is suitably fastened to the forward section 18 by fasteners 30 for example and is provided with an inwardly projecting portion 28 to form the throat section of the exhaust nozzle. The annular exhaust nozzle is also defined by an annular flow controlling valve member 32 displaceable between the flow blocking position as shown in FIGURE 1 during the starting phase of operation and operative position shown in FIGURE 2 during the running condition of the engine. The valve member 32 adjacent end 14 and compressor 20 adjacent the intake end 16, are supported in proper coaxial relationship to the housing assembly 12 by means of an elongated tubular conduit member generally referred to by reference numeral 34, the tubular conduit member being fixedly mounted within the housing and extending between the intake and exhaust ends.

The housing section 26 also mounts intermediate the ends of the housing, a fuel supply nozzle 36 and an ignition device 38 which project into the combustion chamber 22 in order to supply fuel for mixing with the combustion supporting medium introduced into the combustion chamber and to ignite the fuel mixture. Since any suitable fuel supply system and fuel ignition system may be utilized in connection with the engine of the present invention, and since the details of such systems in themselves form no part of the present invention, no further disclosure in connection with the fuel supply and fuel ignition is presented.

The tubular conduit member 34 forms a central passage 40 through which pressurized fluid is supplied to the compressor for operation thereof both during the starting phase and the running phase of the engine. A forward tubular section 42 is received internally within the tubular member 34 adjacent the intake end of the engine and secured to the tubular conduit member by suitable fasteners such as the fasteners 44 in order to form an external bearing surface for the compressor 20, as well as to limit axial displacement of a pressure responsive valve member 46 from the position shown in FIGURE 1 to the position shown in FIGURE 2. The forward end of the tubular section 42 is closed by the block 48 which supports a supply conduit 50 through which a suitable gas under pressure such as air may be externally supplied to the engine for starting purposes. For example, the supply conduit 50 may be connected through a one-way pressure valve 52 and a selectively controlled cut-off valve 54 to a source of air under pressure 56 as shown in FIGURE 1. The tubular conduit member is radially spaced from the internal walls of the housing by means of the compressor 20 adjacent the forward intake end and by means of the guide vanes 58 on the rearward side of the combustion chamber 22. The guide vanes 58 are secured to a radially projecting portion 60 of the tubular conduit member which encloses a pressure chamber 62 within which a forward portion of the valve member 32 is received on one side of its internal piston section 64. The valve member is also slidably supported on the tubular conduit member 34 by the stop element 66 axially affixed to the tubular conduit member by means of the fastener 68 in order to form another pressure chamber 70. Also, fixedly mounted internally of the tubular conduit member 34 at the exhaust end of the housing, is a tubular section 72 having an intermediate wall 74 with a vent passage 76 formed therein. The tubular section 72 slidingly receives on the forward side of the wall 74, a diametrically reduced portion 78 of the valve member 46 about which a pressure sealed chamber 80 is formed between the tubular section 72 and the diametrically larger portion 82 of the valve member which is slidably received by the tubular conduit member between the forward tubular section 42 and the rear tubular section 72. An axial bore 84 is formed within the valve member 46 in constant fluid communication with the central passage 40 of the tubular conduit member.

The tubular conduit member is provided with a series of circumferentially spaced passages 86 which are adapted to be aligned with corresponding ports 88 in the valve member 46 as shown in FIGURE 2 in order to establish restricted fluid communication between the combustion chamber 22 and the central passage 40. A second series of passages 90 are formed in the tubular conduit member in order to constantly establish restricted fluid communication between the combustion chamber and the pressure sealed, expansible chamber 80 defined between the reaction face 92 on the rear tubular section 72 and the pressure responsive face 94 of the valve member 46. A third series of passages 96 is formed in the tubular conduit member between the expansible chamber 80 and the pressure chamber 62 associated with valve member 32. Finally, a restricted passage 98 is formed in the tubular conduit member and the rear tubular section 72 establishing fluid communication between the pressure chamber 70 and either the bore 84 of the valve member 46 or the vent chamber 100 formed between the wall 74 and the rear end of the valve member 46 as shown in FIGURE 2. The valve member 46 is therefore provided with ports 102 adapted to be aligned with the passages 98 when the valve member is in the position shown in FIGURE 2 corresponding to the starting phase of operation.

Referring now to FIGURES 1 and 3 through 7, one form of compressor is shown utilizing a single rotor assembly having an axially elongated hub 104 rotatably mounted on the forward tubular section 42 by the spaced bearings 106. Thrust bearings 108 at opposite axial ends of the hub 104 axially position the rotor assembly between the thrust end portion 110 of the tubular conduit member and the thrust collar 112 axially fixed to the forward tubular section 42. A holding sleeve 114 is fixed to the hub 104 axially spacing two series of circumferentially spaced turbine blades 116 and 118 for simultaneous rotation with the hub in the same rotational direction and at the same speed. It should of course be appreciated that a different rotor arrangement could be utilized as for example a pair of independently mounted, turbine bladed rotors rotating in opposite directions as will be hereafter described by virtue of which the operational speed of the compressor could be reduced in order to avoid cavitational problems. In any event, whether it is a single bladed turbine assembly or two independently mounted rotor assemblies, rotation is imparted to each rotor assembly by the jet discharge of the fluid under pressure from the trailing edges of at least one of the series of turbine blades. As shown in FIGURES 1 and 4, the turbine blades 116 are therefore provided with radial passages 118 that extend through the rotor hub 104 for fluid communication with the central passage 40 in the tubular conduit member 34, fluid passages 120 being formed in the forward tubular section 42 for this purpose. Thus, fluid under pressure supplied to the central passage 40 enters the radial passages 118 in the turbine blades 116 from which they are discharged as jets adjacent the radially outer portion of the turbine blades in a rearward direction to produce rotation of the rotor assembly to which the blades 116 are connected. The discharge end portions 122 of the passages 120 are accordingly angled in one direction relative to the rotational plane of the turbine blades 116 in order to produce rotation in the opposite direction.

Fixed inlet guide vanes 124 are mounted forwardly of the turbine blades 116 within the compressor. Guide vanes 126 are also mounted between the turbine blades 116 and 118 while exit guide vanes 128 are mounted rearwardly of the turbine blades 118. Accordingly, the air inflow into the engine undergoes two stage compression within the compressor before it emerges and enters the combustion chamber for mixing with the fuel. In view of the pressure and velocity imparted to the inflow of air, the combustion products resulting from combustion within the combustion chamber 22 are urged rearwardly past the guide vanes 58 into the exhaust nozzle 24, the guide vanes 58 reducing turbulence and vortical flow so as to produce axial flow and thrust upon discharge from the exhaust nozzle.

From the foregoing description, the construction and operation of the engine will be apparent. During the starting phase of operation, as shown in FIGURE 1, the valve member 46 is in its flow blocking position wherein the ports 88 are out of registry with the passages 86 so as to block any fluid communication between the combustion chamber 22 and the central passage 40 to the compressor 20. The engine is started by opening the valve 54 so as to supply air under pressure through the oneway check valve 52 to the compressor. Air under pressure will accordingly flow through the radial passages 120 within the turbine blades 116 producing rotation of the rotor assembly. The air under pressure supplied to the central passage 40 of the tubular conduit member will also flow through bore 84, port 102 and passages 98 into the pressure chamber 70 urging the valve member 32 in a left-hand direction as viewed in FIGURE 1 thereby closing the throat section of the exhaust nozzle. The combustion chamber 22 is thereby sealed so as to permit rapid build-up of pressure therewithin once combustion begins. The engine will therefore start when the compressor begins to draw in air under pressure through the intake end 16 and the propellant fuel is supplied through the nozzle 36 to form a fuel mixture ignited by the ignition device 38. When the pressure within the combustion chamber has risen to its proper value, the chamber 80 is pressurized to cause axial displacement of the valve member 46 bringing the ports 88 into registry with the passages 86 as shown in FIGURE 2 in order to establish restricted fluid communication between the combustion chamber and the central passage 40. At the same time, the chamber 62 is pressurized through the passages 96 so as to cause axial shift of the nozzle valve member 32 to its operative position as shown in FIGURE 2. Fluid within the opposing pressure chamber 70 is at this time vented through the vent chamber 100 expanded in response to axial shift of the valve member 46 to its flow establishing position. Accordingly, combustion products are axially discharged through the nozzle 24 in order to produce thrust at the same time that a small diverted portion of the combustion products enter the central chamber 40. When the pressure of the combustion products entering the chamber 40 reach a predetermined value, the check valve 52 closes terminating the starting phase of operation. The combustion products then form the pressurized fluid that is discharged from the turbine blades 116 in order to impel and maintain rotation of the compressor rotor assembly.

FIGURES 8 and 9 illustrate a modified form of engine similar in construction and operation to the engine 10 illustrated in FIGURES 1 through 7 except for the exhaust nozzles and valve assembly. As shown in FIGURES 8 and 9, the housing assembly generally referred to by reference numeral 12′ has a tubular conduit member 34′ mounted therewithin which extends through the combustion chamber 22′ into the exhaust nozzle portion 24′ adjacent the exhaust end 14′. The rear end of the tubular conduit member 34′ is connected to a diametrically enlarged chamber portion 130 enclosing a static pressure chamber 132. The chamber portion 130 is radially spaced from the internal walls of the tubular housing 12′ by means of the guide vanes 134 within the throat section of the exhaust nozzle. Restricted fluid communication is established between the combustion chamber 22′ and the static pressure chamber 132 by means of the passages 136. Accordingly, the pressure within chamber 132 will build up in delayed response to a buildup of pressure within the combustion chamber 22′ in order to axially shift a valve member 138 between the position shown in FIGURE 8 to the position shown in FIGURE 9. The valve member 138 is slidably mounted within a rear tubular section 140 fixed to the rear end of the tubular conduit member 34′ and projecting into the chamber 132 to thereby expose the end pressure face 142 of the valve member to the pressure within chamber 132. The forward end of the valve member opposite the pressure face 142 is provided with a venturi nozzle 144 through which fluid communication is established between the bore 146 in the valve member and the central passage 148 formed in the tubular conduit member 34′. The central passage 148 communicates with the compressor of the engine as hereinbefore descmribed in connection with central passage 40 in FIGURES 1 through 7. The valve member 138 may also be provided with an intermediate flange portion 148 adapted to be displaced with the valve member between positions abutting the forward end of the rear tubular section 140 and the rear end of a tubular liner 150 within the tubular conduit member 34′. The tubular conduit member 34′ and the rear tubular section 140 are provided with restricted flow passages 152 adapted to be registered with ports 154 in the valve member 138 when the valve member is in the position shown in FIGURE 9. Thus, when the engine is in its starting phase of operation as shown in FIGURE 8, the valve member 138 will block fluid communication between the combustion chamber 22′ and the compressor. Pressure will accordingly then build up within the static pressure chamber 132 until it reaches a sufficient value to axially displace the valve member 138 to the position shown in FIGURES 9 and 10. Restricted fluid communications will then be established between the combustion chamber and the bore 146 of the valve member so as to supply combustion products under pressure through the venturi nozzle 144 to the central passage 148. The combustion products will then replace the external, pressurized fluid as the operating medium for the compressor.

Referring now to FIGURE 11, a modified form of engine is shown wherein the tubular conduit member 34" on which the compressor 20 is mounted, is extended forwardly and is formed with separate passages 156, 158 and 160. Air under pressure from an external source is thereby supplied through the passage 156 to the central passage 40' within the tubular conduit member 34" in order to start operation of the compressor as hereinbefore described in connection with the engine of Figures 1 through 7. The passage 158 also communicates with the central passage 40' of the engine through a catalyst chamber device 162 in order to supply an oxidizer to the combustion chamber for rocket operation of the engine when insufficient oxygen is available in the inflow at the intake end 164 of the housing 12". Passage 160 also directly communicates with the central passage 40' within the engine in order to inject atomized water for flushing and emergency cooling purposes. The engine may also be conditioned for operation under water by closing the intake end 164 so as to prevent the inflow of any water. Toward this end, a closing valve member 166 may be mounted forwardly of the engine and adapted to be axially displaced by suitable means (not shown) from the solid line position shown in FIGURE 11 to the dotted line position closing the intake end.

It will be appreciated from the foregoing description, that reaction thrust engines may be designed in accordance with the principles of the present invention as either jet engines, rocket motors or as combined jet and rocket engines in order to propel any craft or vehicle in any fluid medium or in space. Regardless of the operating environment, the engine of the present invention is unique in the manner in which the forward compressor is operated either by diverted portions of the combustion products that are utilized to propel the craft on which the engine is mounted or by an external source of gas under pressure for engine starting purposes. It will be apparent therefore, that during the starting phase of operation little energy is diverted for compressor operation so as to avoid power losses during this critical phase of operation. Further, the arrangement for achieving the foregoing objective renders operation more efficient in general, reduces maintenance problems, simplifies construction and increases the versatility of the basic engine design.

FIGURE 12 illustrates an engine which is similar to that described in connection with FIGURES 1 through 7 except for the compressor and a rearwardly opening shroud 170 mounted on the axially elongated housing 172 adjacent to the forward intake end 174. The shroud 170 encloses and rearwardly directs combustion products which are discharged from a plurality of circumferentially spaced outlet openings 176 in the housing, the combustion products discharged from the outlet openings 176 being diverted from the main discharged of combustion products from the rear exhaust end 178 during running operation of the engine. Thus, the engine generally denoted by reference numeral 180 in FIGURE 12, does not recirculate the diverted portion of the combustion products for mixing with the intake air as in the case of the engine 10 illustrated in FIGURES 1-7, but instead discharges the diverted portion of the combustion products from the housing of the engine and thereby avoids mixing the combustion products with the intake air.

Referring now to FIGURES 13 and 14, it will be observed that the compressor generally referred to by reference numeral 182 is mounted adjacent the forward end of the fixedly mounted tubular member 184 within the housing so as to receive a diverted portion of combustion products through the central passage 186 as hereinbefore described in connection with the other forms of the invention. The compressor includes guide vanes 188 and 190 at the inlet and outlet ends thereof through which air is conducted from the intake end 174 into the combustion chamber 192. Rotatably mounted on the tubular member 183 axially between the guide vanes 188 and 190, is a rotor assembly 194 which includes an axially elongated hub portion 196 mounting compressor blades 198 adjacent to the forward guide vanes 188 and compressor blades 200 adjacent to the rear guide vanes 190. A flow-through stator assembly 202 is fixedly mounted by the housing axially between the compressor blades 198 and 200. The stator assembly includes a radially outer portion 204 having an annular recess 206 which forms an exhaust chamber 208 within the housing alined with the annular drive portion 210 connected peripherally to the compressor blades 198 of the rotor assembly. The exhaust chamber 208 is vented through the outlet openings 176 aforementioned.

Extending through the compressor blades 198, are radially extending passages 212 establishing fluid communication between the central passage 186 in the tubular member 184 and the outlets 214 formed in the annular drive portion 210 of the rotor assembly. The outlets 214 are disposed at an angle to the rotational axis of the rotor assembly as shown in FIGURE 15 so that fluid discharged therefrom will produce a reaction thrust tending to rotate the rotor assembly in one direction. The fluid discharged from the outlets 214, is received within bucket cavities 216 formed in the outer portion 204 of the stator assembly. Thus, the buckets 216 in the stator assembly will receive charges of combustion products from the rotor assembly when alined with the outlets 214 as shown in FIGURE 15. The charges may then enter the fluid receiving cavities 218 formed in the drive portion 210 of the rotor assembly adjacent to the outlets 214 when the fluid receiving cavities are alined with the buckets 216 as shown in FIGURE 16. An additional thrust may thereby be imparted to the rotor assembly for driving the compressor. The pressure energy of the combustion products is converted into additional kinetic energy of the compressor rotor in a final stage when fluid from the buckets 216 is received in the discharge passage 220 also formed in the drive portion 210 of the rotor assembly having an inlet end adapted to be alined with the buckets 216 as shown in FIGURE 17, the outlet ends of the discharge passages 220 being alined with the annular exhaust chamber 208. The combustion products may then be discharged through the outlet openings 176 and directed rearwardly of the housing by means of the shroud 170 so that any additional kinetic energy remaining in the combustion products will produce forward thrust although most of the energy will have been converted into kinetic energy of the rotor assembly 194 because of the multistage conversion described. Thus, more efficient operation of the compressor 182 will be effected and mixing of the combustion products with the intake air avoided.

FIGURE 19 illustrates yet another form of engine generally denoted by reference numeral 222 operating under basically similar principles as hereinbefore described for engines operating in the earth's atmosphere. The engine 222 includes therefore an axially elongated housing 224 having an intake end 226 and an exhaust end 228. A compressor generally referred to by reference numeral 230 is mounted within the housing adjacent the intake end for supplying air under pressure to the combustion chamber 232 within which a combustible mixture is ignited as hereinbefore indicated in connection with the other forms of the invention. The combustion products are then discharged from the exhaust end 228 through an annular nozzle 234 mounted internally of the housing adjacent the exhaust end. The nozzle includes a radially inner throat forming section 236 adapted to be engaged by a flow restricting control member 238 displaceable between a combustion chamber sealing position illustrated in FIGURE 19 and an open position as illustrated in FIGURE 24. The position of the flow control member 238 is controlled by a pressure responsive valve assembly generally referred to by reference numeral 240 through which a portion of the combustion products from the combustion chamber are diverted into the central passage 242 of the tubular conduit member 244 whereby the combustion products are supplied to the compressor 230 for powered operation thereof under running conditions of the engine as hereinbefore described in connection with the other forms of the invention.

The compressor 230 like the compressor 182 hereinbefore described in connection with FIGURES 12–18, discharges the combustion products externally of the housing so as to avoid mixing thereof with the intake air. The compressor 230 however is provided with two independently mounted rotors 246 and 248 for rotation in opposite directions. The rotors are respectively provided with compressor blades 250 and 252 through which two stage compression of the intake air is effected. The compressor blades are radially mounted on the hubs 254 and 256 independently journaled on the tubular member 244 rearwardly of the radial heat transfer tubes 258 fixedly mounted on the tubular member 244 in a radiant heating zone adjacent the intake end 226. The tubes are interconnected by heat conducting webs 259 as shown in FIGURE 20 to increase the heat radiating surface area. Also fixed to the housing and extending from the intake end is an annular shroud 260 forming a diverging exhaust passage 262 through which the diverted portion of the combustion products is conducted from the central passage 242 through radial passages 264 formed in the tubes 258. Kinetic energy is absorbed from the combustion products in order to drive the compressor blades in opposite directions by means of the impulse turbine vanes 266 and 268 peripherally mounted by the rotors 246 and 248 within the annular passage 262. Also fixedly mounted within the passage 262 adjacent to and in operative relation to the turbine vanes, is an annular nozzle member 270 having radially inner nozzle passages 272 and radially outer nozzle passages 274 respectively discharging combustion products against the turbine vanes 266 and 268. The curvature and angles of the nozzle passages and turbine blades are such as to produce rotation of the rotors 246 and 248 in opposite directions as illustrated in FIGURES 22 and 23. It will be apparent therefore, that the diverted portion of the combustion products will produce contra-rotation of the compressor rotors and then discharge the combustion products externally of the engine housing. Further, heat energy is extracted from the combustion products while passing through the heat transfer tubes 258 to heat and volumetrically expand the intake air prior to its passage through the contra-rotating compressor blades 246 and 248 for higher operating efficiency.

In order to accommodate operation of the engine under both starting conditions and running conditions utilizing contra-rotating compressor rotors, the pressure responsive valve assembly 240 is designed to variably restrict or throttle the main flow of combustion products through the exhaust nozzle 234 until such time as the compressor reaches its maximum rotating efficiency establishing a resistance to any substantial inflow of combustion products while the flow control member 238 is moved to its fully opened position shown in FIGURE 24. The valve assembly includes a tubular valve body 276 connected to the tubular conduit member 244 within the combustion chamber and extending rearwardly therefrom through the exhaust nozzle 234. A sealing cover 278 is fixed to and encloses the enlarged rear end portion 280 of the valve body forming a pressure chamber 282. The valve body slidably mounts a valve member 284 having a tubular flow passage 286 closed at one end 288 and opened at the forward end which mounts a venturi nozzle 290 from which a diverted portion of the combustion products is conducted into the central passage 242 for operation of the compressor 230.

The valve member also is provided with an annular pressure face 292 subject to the pressure developed within the expansible chamber 294 enclosed within the valve body about the valve member. Restricted fluid communication is established between the combustion chamber 232 and the valve chamber 294 through a plurality of radial passages 296 formed in the valve body. Accordingly, it will be apparent that any increase in pressure within the combustion chamber will pressurize the valve chamber 294 so as to forwardly displace the valve member from the position shown in FIGURE 19 to the position shown in FIGURE 24 aligning the valve passages 298 with the ports 300 in the valve body in order to establish fluid communication between the combustion chamber and the central passage 242 through the venturi nozzle 290. It will also be observed, that the valve chamber 294 is in restricted fluid communication with a pressure chamber 302 through passages 304, the pressure chamber 302 being formed on one side of the piston element 306 associated with the flow controlling member 238. Pressurization of the valve chamber 294 causing shift of the valve member 284 to its flow establishing position, will therefore also begin to pressurize the chamber 302 tending to displace the flow control member 238 toward its open position as shown in FIGURE 24.

Also formed within the flow controlling member 238 about the valve body 276 on the side of the piston element 306 opposite the chamber 302, is a second pressure chamber 308. The chamber 308 is in restricted fluid communication with the passage 286 in the valve member through restricted valve passage 310 alined either with the port 312 or the port 314 formed in the valve body. In the flow blocking position of the valve member, the restricted passage 310 is aligned with the valve port 312 as shown in FIGURE 19. In the flow establishing position of the valve member however, the restricted passage 310 is aligned with the valve port 314, as shown in FIGURE 24. In the flow establishing position of the valve member 276, chamber 308 will be in fluid communication with chamber 282 through the port 312 and the passage 316 in the end portion 280 of the valve body. Restricted passageways 318 are formed in the end portion 280 of the valve body so as to establish fluid communication between the pressure chamber 282 and an annular pressure chamber 320 to which the end face 322 of the flow controlling member 238 is exposed tending to displace this member to its sealing position, shown in FIGURE 19.

Before the engine 222 is started, the combustion chamber 232 will be sealed by the flow controlling member 238 as shown in FIGURE 19. When combustion is initiated, a rapid rise of pressure occurs within the combustion chamber since it is sealed by the flow controlling member 238 causing a sequential pressurization of chambers 294, 302 and 308. The valve member 284 is accordingly displaced to its flow establishing position shown in FIGURE 24 so as to conduct some of the combustion products to the compressor for operation thereof. The flow controlling member 238 on the other hand is displaced by a small amount toward the open position because of the opposing pressures exerted on its piston element 306. In this regard, it will be apparent that when the valve member 284 is displaced to its flow establishing position, fluid communication is established between the piston chamber 308 and the pressure chamber 282 so as to reduce the pressure within the chamber 308. Accordingly, after the starting phase, combustion products are merely bled through the exhaust nozzle 234 permitting the pressure within the combustion chamber to continue to rise. As the pressure of the combustion products supplied to the compressor increases, the pressure within chamber 308 increases since it is in fluid communication with the passage 286. As the pressure within the combustion chamber increases, the pressure within piston chamber 302 increases tending to further displace the flow controlling member 238 toward its open position. However, a corresponding increase in the pressure of the combustion products supplied to the compressor also increases the pressure within chamber 308 and the pressure of the fluid supplied to the chamber 320 tending to displace the flow controlling member 238 toward its closed position. The flow controlling member will therefore continue to restrict the flow of combustion products through the exhaust nozzle until such time as the compressor is operating at maximum rotating efficiency so as to lower the inlet pressure of the combustion products thereto. The pressure differential acting on the piston element 306 will then accordingly displace the flow controlling member 238 to its fully opened position.

An underwater version of an engine most similar to the engine 222 illustrated in FIGURE 19, is shown in FIGURE 25 and is generally denoted by reference numeral 324. A contra-rotating rotor type of compressor 230' is associated with engine 324 similar in arrangement and operation to compressor 230 of engine 222, located at the forward end of an inner tubular housing 224'. Combustion supporting fluid is thus supplied by the compressor to the combustion chamber 232' from which combustion products are discharged through nozzle 234' similar in arrangement and operation to nozzle 234 of engine 222 and controlled by a valve assembly 240' in a manner similar to valve assembly 240 from which a diverted portion of the combustion products is supplied to the turbine nozzles associated with the compressor 230' through conduit 244' and radial tubes 258' located in the radiant heating zone forwardly of the compressor. An insulated outer housing 326 is supported in radially spaced relation on the inner housing to define an annular passage 328 into which the turbine vanes of the compressor rearwardly discharge. The discharged gases displace any water in passage 328 through a drain tube 330 when the annular nozzle valve member 332 slidably mounted by the outer housing adjacent the discharge end 334, is closed. An annular nozzle throat-forming valve seat 336 is therefore formed on the inner housing for seating the valve member 332 in its closed position establishing fluid communication through passage 338 from the annular discharge passage 328 to the vent tube 330. An increase in pressure in the passage 328 opens the nozzle valve member to permit discharge of gases to augment the main thrust produced by discharge through nozzle assembly 234' while closing the vent tube 330. Flow through nozzle valve 332 is throttled or regulated simultaneously with the throttling of flow through nozzle 234' by fluid under pressure conducted to chamber 338 through passages 340 from the valve assembly 240'. Fluid passages 342 accordingly extend from chamber 338 to the nozzle valve 332 for this purpose.

It will be observed from FIGURES 25 and 27, that gases are discharged from the end 334 through annular filters or strainers 344 and 346 that keep large solid particles out of the engine. A coarse filter 348 is mounted adjacent the intake end 350 of the engine for similar reasons forwardly of a medium filter 352 through which sea water is drawn into the engine by forward movement of the engine and suction produced by the compressor 230'. The water is then passed through a fine filter body 354 into which a plurality of axially extending tubes 356 project. The tubes are closed at both ends and are provided with apertures 358 so as to conduct water in droplet form into a vaporization zone separated from the filters by an imperforate wall 360 supporting the tubes intermediate the ends thereof.

Figure 28:
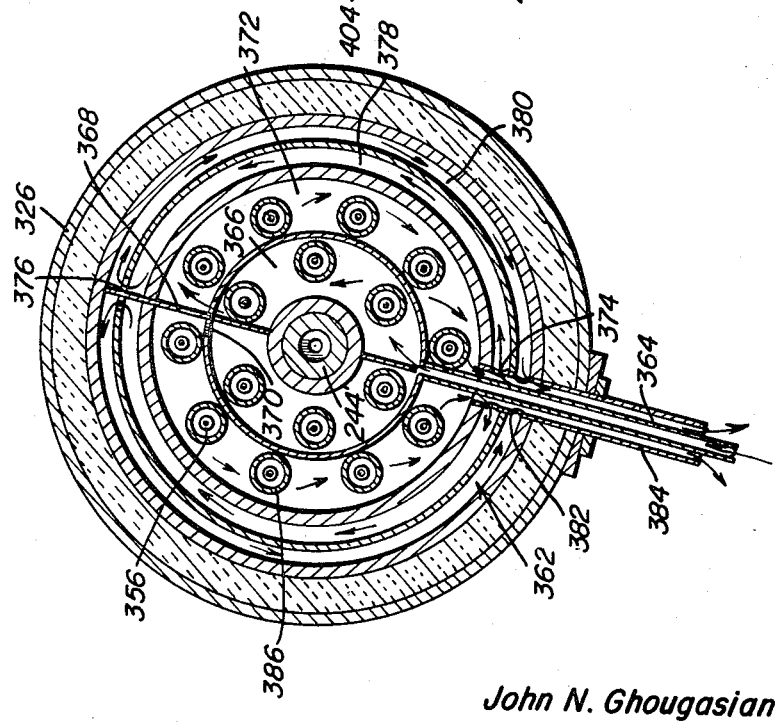
FIGURE 28 is a transverse sectional view taken through a plane indicated by section line 28—28 in FIGURE 25.

As shown in FIGURES 25 and 28, a heat exchanger 362 is located within the vaporization zone into which the tubes 356 project. The heat exchanger includes a radial inlet tube 364 extending through the outer housing 326 terminating at a radially inner heating chamber 366. The inlet tube conducts a fluid heating medium into the inner chamber at 375° F. to 450° F. on either side of a partition 368. The heating medium flows through opening 370 into the annular heating chamber 372 on opposite sides of the partition 368 from which it is conducted through openings 374 and 376 in countercurrent relation through passages 378 and 380 surrounding the heating chambers. Finally, the heating medium passes through openings 382 into an outlet tube 384 for return to the source. The inlet and outlet tubes extend in coaxial relation to each other from the source associated with a suitable heat generating system forming no part of the present invention.

Extending axially through the heating chambers 366 and 372 are a plurality of tubular chamber members 386 closed at ends abutting the wall 360. The apertured tubes 356 project into the tubular members 386 for vaporization of the water therewithin. The ends of the tubular members opposite wall 360 have nozzle openings for flow of heated vapor through outlet openings 388 into a conversion zone within which the vapor is dissociated for release of combustion supporting oxygen prior to entry of the gases into the combustion chamber.

As shown in FIGURES 25 and 29, the heated vapor entering the conversion zone passes into axial passages 390 intersecting the radial passages 392 in the spokes 394 supporting the annular housing 396 to which hydrogen peroxide is supplied through inlet tube 398 from a suitable source (not shown). The hydrogen peroxide is conducted through an annular manifold 400 within the housing to a plurality of catalyst chambers 402 with which the passages 392 communicate for mixing with the heated vapors. Catalyst holding screens are mounted within the chambers 402 so that under the temperature condition established by the heated vapor in the presence of the catalyst, chemical reactions occur producing a mixture of gases including combustion supporting oxygen from the water vapor and the hydrogen peroxide. This combustion supported mixture of gases is drawn into the combustion chamber by the compressor 230' after being further heated in the radiant heating zone by heat transfer from the combustion products in passages 258'.

On starting engine 324, fluid under pressure is supplied from an external source as hereinbefore described to initially operated the compressor 230'. Water is vaporized by the heat exchanger 362 so as to block further inflow of water in a liquid state to the compressor while the nozzles 234' and 332 are closed so that water in liquid state will be blown out of the combustion chamber and passage 328 through drain tube 330. When the engine starts upon ignition of the fuel mixture in the combustion chamber, the exhaust nozzle valves 234' and 332 open and drain tube 330 is closed. Since a combustion supporting mixture will then be drawn into the combustion chamber from the vaporization and conversion zones, self-sustaining operation of the engine ensues as diverted combustion products continue to operate the compressor. The flow rate of combustion supporting mixture will be dependent upon the demands of the combustion process in view of the control exercised by the valve assembly 240' in regulating discharged flow and the response of the compressor 230'.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a thrust producing engine having a housing enclosing a combustion chamber and a reaction exhaust nozzle through which combustion products are discharged rearwardly from the combustion chamber, a fluid driven compressor mounted forwardly of the combustion chamber within the housing, an external source of gas under pressure connected to the compressor for operation thereof during a starting phase, and valve means for supplying a diverted portion of the combustion products to the compressor for continued operation thereof upon termination of said starting phase.

2. The combination of claim 1 including means for sealing said combustion chamber from the exhaust nozzle during the starting phase.

3. The combination of claim 2 including air intake means formed on the housing forwardly of the compressor.

4. The combination of claim 3 including a source of oxidizer, and means connecting said source to the compressor for supply of the oxidizer therethrough to the combustion chamber during rocket operation of the engine.

5. The combination of claim 4 including means for closing said air intake means during underwater operation of the engine.

6. The combination of claim 5 wherein said compressor includes, a stator fixedly mounted within the housing, a rotor rotatably mounted within the housing in operative relation to the stator, said rotor having turbine blades provided with radial passages, and conduit means fixedly mounted within the housing for alternatively conducting fluid under pressure from said external source of gas and the valve means to said radial passages in the turbine blades causing rotation of the rotor.

7. The combination of claim 6 wherein said valve means includes a conduit member fixedly mounted within the housing and extending from the exhaust nozzle to the compressor, a valve member mounted within the conduit member and movable between positions establishing and blocking fluid communication between the combustion chamber and the compressor, said valve member having pressure faces respectively subject to pressurized fluid from said source of gas under pressure and from the combustion chamber to displace the valve member between said positions thereof.

8. The combination of claim 1 wherein said compressor includes, a stator fixedly mounted within the housing, a rotor rotatably mounted within the housing in operative relation to the stator, said rotor having turbine blades provided with radial passages, and conduit means fixedly mounted within the housing for alternatively conducting fluid under pressure from said external source of gas and the valve means to said radial discharge passages in the turbine blades causing rotation of the rotor.

9. The combination of claim 8 wherein said valve means includes a conduit member fixedly mounted within the housing and extending from the exhaust nozle to the compressor, a valve member mounted within the conduit member and movable between positions establishing and blocking fluid communication between the combustion chamber and the compressor, said valve member having pressure faces respectively subject to pressurized fluid from said source of gas under pressure and from the combustion chamber to displace the valve member between said positions thereof.

10. The combination of claim 1 wherein said valve means includes a conduit member fixedly mounted within the housing and extending from the exhaust nozzle to the compressor, a valve member mounted within the conduit member and movable between positions establishing and blocking fluid communication between the combustion chamber and the compressor, said valve member having pressure faces respectively subject to pressurized fluid from said source of gas under pressure and from the combustion chamber to displace the valve member between said positions thereof.

11. The combination of claim 1 including air intake means formed on the housing forwardly of the compressor, and means for closing said air intake means during underwater operation of the engine.

12. The combination of claim 1 including a source of oxidizer, and means connecting said source to the compressor for supply of the oxidizer therethrough to the combustion chamber during rocket operation of the engine.

13. A thrust producing engine comprising, an axially elongated housing having an exhaust end and an intake end, a tubular member fixedly mounted within said housing forming an annular combustion chamber therewithin intermediate said ends, reaction nozzle means formed in said housing on said tubular member adjacent said exhaust end for discharging combustion products, fluid operated compressor means rotatably mounted by said tubular member adjacent said intake end and pressure responsive valve means mounted by the tubular member for movement between positions respectively establishing and blocking fluid communication between the combustion chamber and the compressor means.

14. The combination of claim 13 wherein said nozzle means comprises, static pressure chamber means connected to the tubular member and forming an annular throat passage within the housing adjacent said exhaust end, guide vanes in the annular passage radially spacing said static pressure chamber means from the housing, and restricted passages between the chamber means and the combustion chamber.

15. The combination of claim 13 wherein said nozzle means comprises, a valve member movably mounted by the tubular member for displacement between an operative position forming an annular throat passage within the housing adjacent said exhaust end and a flow blocking position sealing the combustion chamber, and fluid pressure operated means for displacing said valve member to the operative position in response to pressurization of the combustion chamber by combustion products simultaneously causing movement of the pressure responsive valve means to said position establishing fluid communication.

16. The combination of claim 15 including a source of external gas under pressure and one-way valve means connecting said source to the tubular member for supply of pressurized fluid to the compressor means when the pressure responsive valve means is in the position blocking fluid communication.

17. The combination of claim 13 including a source of external gas under pressure and one-way valve means connecting said source to the tubular member for supply of pressurized fluid to the compressor means when the pressure responsive valve means is in the position blocking fluid communication.

18. The combination of claim 17 wherein said nozzle means comprises, static pressure chamber means connected to the tubular member and forming an annular throat passage within the housing adjacent said exhaust end, guide vanes in the annular passage radially spacing said static pressure chamber means from the housing, and restricted passages between the chamber means and the combustion chamber.

19. The combination of claim 13 including conduit means connected to the tubular member adjacent said intake end of the housing for supply of oxidizer to the compressor means.

20. In a thrust producing engine having a combustion chamber, an exhaust nozzle discharging combustion products produced in the combustion chamber and a compressor supplying a combustion supporting medium to the combustion chamber, means located adjacent said compressor for operating said compressor in response to flow of combustion products therethrough and means including a valve for supplying a diverted portion of the combustion products from the combustion chamber to the compressor operating means.

21. The combination of claim 1 wherein said compressor includes, a stator fixedly mounted within the housing having fluid receiving buckets and an annular recess forming an exhaust chamber vented through the housing, a rotor rotatably mounted within the housing in operative relation to the stator, said rotor including radial passages provided with outlets aligned with the buckets, fluid receiving cavities aligned with said buckets and fluid discharge passages having inlet and outlet ends respectively aligned with said buckets and the vented exhaust chamber.

22. The combination of claim 13 wherein said compressor means includes, a stator fixedly mounted within the housing having fluid receiving buckets and an annular recess forming an exhaust chamber vented through the housing, a rotor rotatably mounted within the housing in operative relation to the stator, said rotor including radial passages provided with outlets aligned with the buckets, fluid receiving cavities aligned with said buckets and fluid discharge passages having inlet and outlet ends respectively with said buckets and the vented exhaust chamber.

23. The combination of claim 20 wherein said compressor means includes, a stator fixedly mounted within the housing having fluid receiving buckets and an annular recess forming an exhaust chamber vented through the housing, a rotor rotatably mounted within the housing in operative relation to the stator, said rotor including radial passages provided with outlets aligned with the buckets, fluid receiving cavities aligned with said buckets and fluid discharge passages having inlet and outlet ends respectively aligned with said buckets and the vented exhaust chamber.

24. The combination of claim 1 wherein said compressor comprises a pair of bladed rotors rotatably mounted within said housing having peripherally mounted turbine vanes, annular passage means mounted by the housing through which said diverted portion of the combustion products is conducted externally of the housing, said turbine vanes of the rotors projecting into the annular passage, and nozzle means mounted in the annular passage means for directing the flow of said diverted portion of the combustion products against the turbine vanes producing rotation of the rotors in opposite directions.

25. The combination of claim 24 wherein said valve means includes a conduit member fixedly mounted within the housing and extending from the exhaust nozzle to the compressor, a valve member mounted within the conduit member and movable between positions establishing and blocking fluid communication between the combustion chamber and the compressor, said valve member having pressure faces respectively subject to pressurized fluid from said source of gas under pressure and from the combustion chamber to displace the valve member between said positions thereof.

26. The combination of claim 25 including flow control means for variably restricting flow of combustion products through the reaction exhaust nozzle, means responsive to pressure developed in the combustion chamber for urging the flow control means toward an open position, and differential pressure means responsive to movement of the valve member to flow establishing position for urging the flow control means toward a position sealing the combustion chamber, whereby combustion products are bled through the nozzle until the compressor is operating at maximum efficiency.

27. The combination of claim 20 including flow control means for variably restricting flow of combustion products through the reaction exhaust nozzle, means responsive to pressure developed in the combustion chamber for urging the flow control means toward an open position, and differential pressure means responsive to said supply of combustion products to the compressor for urging the flow control means toward a position sealing the combustion chamber, whereby combustion products are bled through the nozzle until the compressor is operating at maximum efficiency.

28. The combination of claim 27 wherein said compressor comprises a pair of bladed rotors rotatably mounted within said housing having peripherally mounted turbine vanes, annular passage means mounted by the housing through which said diverted portion of the combustion products is conducted externally of the housing, said turbine vanes of the rotors projecting into the annular passage, and nozzle means mounted in the annular passage means for directing the flow of said diverted portion of the combustion products against the turbine vanes producing rotation of the rotors in opposite directions.

29. A thrust producing engine comprising, a housing having an intake end and an exhaust end, a compressor mounted within said housing adjacent the intake end, a reaction nozzle mounted within the housing adjacent said exhaust end, combustion means mounted within said housing intermediate said intake and exhaust ends for generating fluid under pressure, pressure responsive valve means operatively mounted within said housing for controlling the flow of said fluid to the reaction nozzle from the combustion means, fluid operated turbine means peripherally mounted by the compressor for powered rotation thereof, and passage means mounted by the housing for conducting a portion of said fluid diverted from the valve means through the turbine means.

30. The combination of claim 29 including means for conducting the fluid discharged from the turbine means externally of the housing.

31. The combination of claim 30 wherein said passage means comprises heat transfer tubes mounted adjacent said intake end forwardly of the compressor in heat transfer relation to air entering the intake end of the housing.

32. The combination of claim 29 wherein said passage means comprises heat transfer tubes mounted adjacent said intake end forwardly of the compressor in heat transfer relation to air entering the intake end of the housing.

33. The combination of claim 29 including insulated discharge passage means mounted on the housing conducting discharge products from the fluid operated turbine means, throttle valve means operatively connected to the pressure responsive valve means for draining liquid and regulating discharge flow from the insulated discharge passage means, and internal means for supplying a combustion supporting mixture to the compressor.

34. The combination of claim 33 wherein said internal means comprises filter means mounted at said intake end of the housing through which water passes, heat exchange means receiving water from the filter means for vaporization and heating thereof, and conversion means through which heated vapor passes from the heat exchange means for producing said combustion supporting mixture.

References Cited

UNITED STATES PATENTS

| 2,404,275 | 7/1946 | Clark | 60—39.52 |
| 2,592,938 | 4/1952 | McNaught | 60—39.52 |
| 2,670,597 | 3/1954 | Villeméjane | 60—269 |
| 2,673,445 | 3/1954 | Bruckmann | 60—263 |
| 2,735,499 | 2/1956 | Ehlers | 60—269 |
| 2,825,205 | 3/1958 | Racine | 60—263 |
| 2,883,828 | 4/1959 | Howell | 60—246 |
| 2,906,092 | 9/1959 | Haltenberger | 60—39.52 |
| 3,095,696 | 7/1963 | Rumble | 60—269 |
| 3,162,010 | 12/1964 | Mohrhauser | 60—269 |
| 3,216,191 | 11/1965 | Madison | 60—269 |
| 3,241,310 | 3/1966 | Hoadley | 60—269 |

FOREIGN PATENTS 541,349  11/1941  Great Britain.

MARTIN P. SCHWADRON, *Primary Examiner*

DOUGLAS HART, *Assistant Examiner.*